United States Patent
Foord

(10) Patent No.: US 9,835,799 B2
(45) Date of Patent: Dec. 5, 2017

(54) LOOSE TUBE FIBER CABLE ADAPTER AND SPLICE-ON CONNECTOR ADAPTER

(71) Applicant: Greenlee Textron Inc., Rockford, IL (US)

(72) Inventor: Keith Roy Foord, Hamilton (CA)

(73) Assignee: TEXTRON INNOVATIONS INC., Providence, RI (US)

( * ) Notice: Subject to any disclaimer, the term of this patent is extended or adjusted under 35 U.S.C. 154(b) by 108 days.

(21) Appl. No.: 15/084,965

(22) Filed: Mar. 30, 2016

(65) Prior Publication Data

US 2016/0291250 A1    Oct. 6, 2016

Related U.S. Application Data

(60) Provisional application No. 62/141,988, filed on Apr. 2, 2015.

(51) Int. Cl.
   *G02B 6/25* (2006.01)
   *G02B 6/255* (2006.01)
   *B26F 3/00* (2006.01)

(52) U.S. Cl.
   CPC .............. *G02B 6/2555* (2013.01); *G02B 6/25* (2013.01); *G02B 6/2551* (2013.01); *G02B 6/2556* (2013.01); *G02B 6/2557* (2013.01); *B26F 3/00* (2013.01)

(58) Field of Classification Search
   CPC ...... G02B 6/2555; G02B 6/25; G02B 6/2551; G02B 6/2557; G02B 6/2556; B26F 3/00
   See application file for complete search history.

(56) References Cited

U.S. PATENT DOCUMENTS

| | | | | |
|---|---|---|---|---|
| 4,276,113 A | * | 6/1981 | Carlsen | G02B 6/255 156/158 |
| 4,615,581 A | * | 10/1986 | Morimoto | G02B 6/3822 385/60 |
| 4,695,126 A | * | 9/1987 | Cook | G02B 6/262 385/58 |
| 5,048,908 A | * | 9/1991 | Blonder | G02B 6/243 225/96.5 |

(Continued)

OTHER PUBLICATIONS

Fujikura data sheet, Sheath Clamp CLAMP-370 series, No. B-13M0062, Date of issue: Nov. 15, 2013, 1 page.

(Continued)

*Primary Examiner* — Sean Michalski
(74) *Attorney, Agent, or Firm* — Klintworth & Rozenblat IP LLP

(57) ABSTRACT

An adapter is configured to hold a loose tube fiber cable and is mountable into a fusion splicer. The adapter includes a clamp base having a first and second grooves, each groove having a centerline, a width and a depth. The depth of the second groove is greater than the depth of the first groove, such that a shoulder is formed between the first and second grooves. The centerlines of the grooves align. This allows for the loose tube fiber cable or splice-on connector to be properly positioned within the grooves. The first groove is V-shaped. The second groove may be V-shaped, U-shaped or square-shaped. A clamp cover seats on the clamp base. The clamp cover has a compressible pad which, when the clamp cover is placed into a facing relationship with the clamp base, the pad aligns with the first groove.

20 Claims, 4 Drawing Sheets

(56) References Cited

U.S. PATENT DOCUMENTS

| | | | |
|---|---|---|---|
| 5,188,268 A * | 2/1993 | Hakoun | B26D 7/14 225/105 |
| 5,395,025 A * | 3/1995 | Borer | G02B 6/25 225/102 |
| 5,717,813 A * | 2/1998 | Harman | G02B 6/2551 219/383 |
| 5,740,301 A * | 4/1998 | Harman | G02B 6/2551 156/257 |
| 5,813,902 A * | 9/1998 | Wiegand | B24B 19/226 225/2 |
| 6,099,684 A * | 8/2000 | Dannoux | G02B 6/30 156/153 |
| 6,203,213 B1 * | 3/2001 | Seo | G02B 6/2551 385/95 |
| 6,425,693 B2 * | 7/2002 | Schmatz | G02B 6/3839 385/59 |
| 6,430,351 B1 * | 8/2002 | Takahashi | G02B 6/2551 385/137 |
| 6,516,131 B1 * | 2/2003 | Tullis | G02B 6/3636 385/137 |
| 6,553,173 B1 * | 4/2003 | Goto | G02B 6/255 385/137 |
| 6,628,879 B2 * | 9/2003 | Robinson | G02B 6/25 225/96 |
| 6,963,687 B2 * | 11/2005 | Vergeest | B23K 26/0648 385/115 |
| 7,070,078 B2 * | 7/2006 | Song | B26D 1/18 225/105 |
| 7,371,020 B2 | 5/2008 | Kanda et al. | |
| 7,407,333 B2 * | 8/2008 | Horino | G02B 6/255 385/137 |
| 7,438,485 B2 | 10/2008 | Takata et al. | |
| 7,502,542 B2 * | 3/2009 | Fujisawa | B08B 3/12 385/134 |
| 8,459,877 B2 * | 6/2013 | Barnes | G02B 6/245 385/134 |
| 9,144,917 B1 * | 9/2015 | Gregorski | G02B 6/00 |
| 2007/0047883 A1 * | 3/2007 | Watte | G02B 6/3802 385/99 |
| 2009/0220203 A1 * | 9/2009 | Pracklein | G02B 6/25 385/134 |
| 2010/0183273 A1 * | 7/2010 | Heidler | G02B 6/245 385/134 |
| 2010/0239221 A1 * | 9/2010 | Robichaud | G02B 6/25 385/136 |
| 2011/0247200 A1 * | 10/2011 | Leyva, Jr. | G02B 6/3616 29/700 |
| 2012/0145307 A1 * | 6/2012 | Margolin | G02B 6/3885 156/72 |
| 2012/0243839 A1 * | 9/2012 | Tamekuni | G02B 6/2555 385/97 |
| 2013/0156379 A1 * | 6/2013 | Ott | G02B 6/36 385/76 |
| 2015/0323746 A1 * | 11/2015 | Yuan | G02B 6/25 269/127 |
| 2016/0266315 A1 * | 9/2016 | Miyamori | G02B 6/2553 |
| 2016/0282569 A1 * | 9/2016 | Bolle | G02B 6/3898 |
| 2017/0235051 A1 * | 8/2017 | Kurino | G02B 6/25 83/887 |

OTHER PUBLICATIONS

AFL, Fusion Splicing Systems, Fujikura 70S Fusion Splicer, copyright 2013, 2 pages.

* cited by examiner

LOOSE TUBE FIBER CABLE ADAPTER AND SPLICE-ON CONNECTOR ADAPTER

This application claims the domestic benefit of U.S. Provisional Application Ser. No. 62/141,988, filed on Apr. 2, 2015, the contents of which are incorporated herein in its entirety.

FIELD OF THE DISCLOSURE

The present disclosure relates to fusion splicing, and particularly relates to fusion splicing loose tube fiber cables to another optical fiber cable or to a splice-on connector.

BACKGROUND

There are two different types of fiber optic cable construction, loose tube cables and tight buffered cables. Loose tube cables have a semi-rigid protective outer jacket in which the fibers are enclosed. Each fiber is bundled loosely within the outer jacket and the fibers can move relative to the jacket. In tight buffered cables, the fibers are bound tightly to the jacket and cannot move relative to the jacket. Since the fibers are loose within the jacket in a loose tube cable, splicing the loose tube cable with another optical fiber cable or to a splice-on connector can be difficult.

SUMMARY

An adapter in accordance with some example embodiments is configured to hold a loose tube fiber cable, and is mountable into a fusion splicer. The adapter includes a clamp base having a first and second grooves, each groove having a centerline, a width and a depth. The depth of the second groove is greater than the depth of the first groove, such that a shoulder is formed between the first and second grooves. The centerlines of the grooves align. This allows for the loose tube fiber cable or splice-on connector to be properly positioned within the grooves. The first groove is V-shaped. The second groove may be V-shaped, U-shaped or square-shaped. A clamp cover seats on the clamp base. The clamp cover has a compressible pad which, when the clamp cover is placed into a facing relationship with the clamp base, the pad aligns with the first groove.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
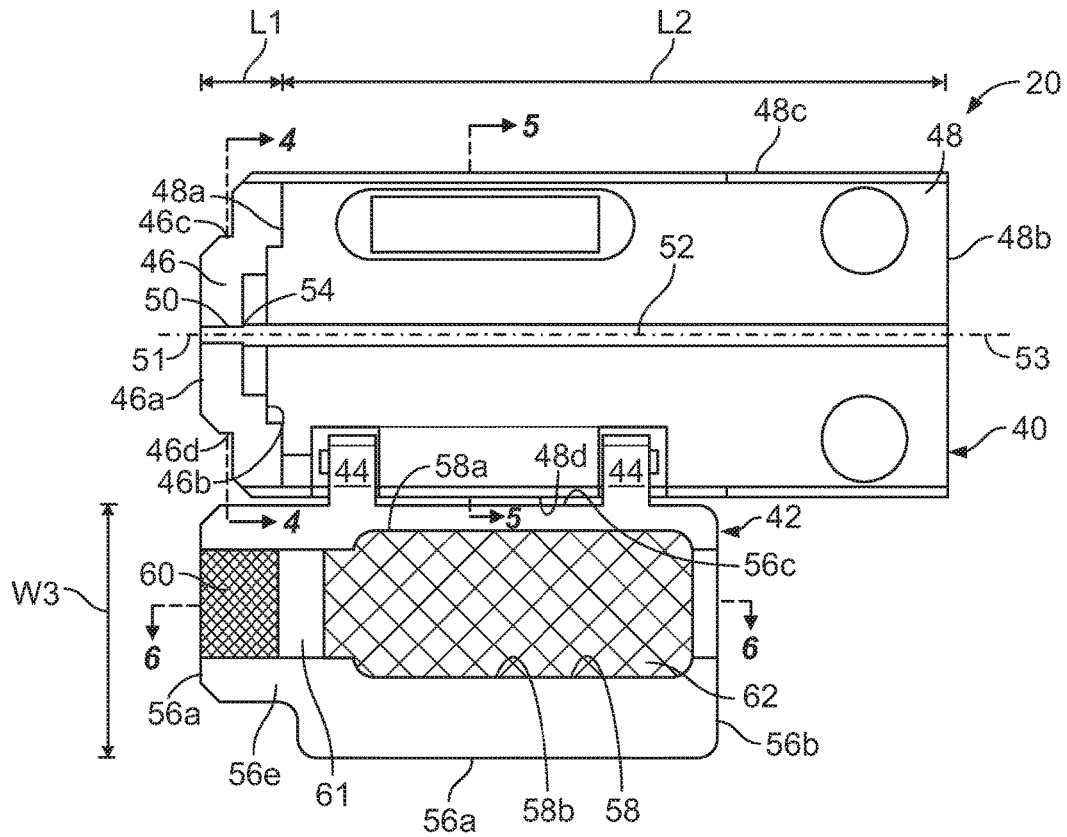
FIG. 1 is a top plan view of an adapter which is configured to hold a loose tube fiber cable.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 2:
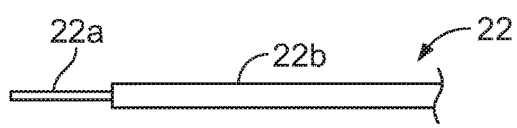
FIG. 2 is a top plan view of a loose tube fiber cable.
Figure 3:
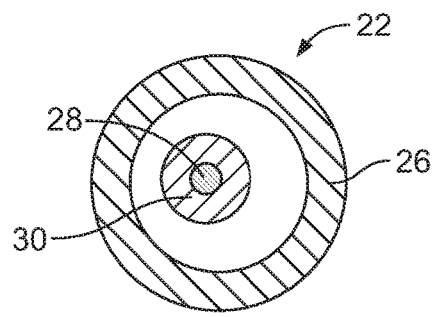
FIG. 3 is a cross-sectional view of the loose tube fiber cable of FIG. 2.
Figure 7:
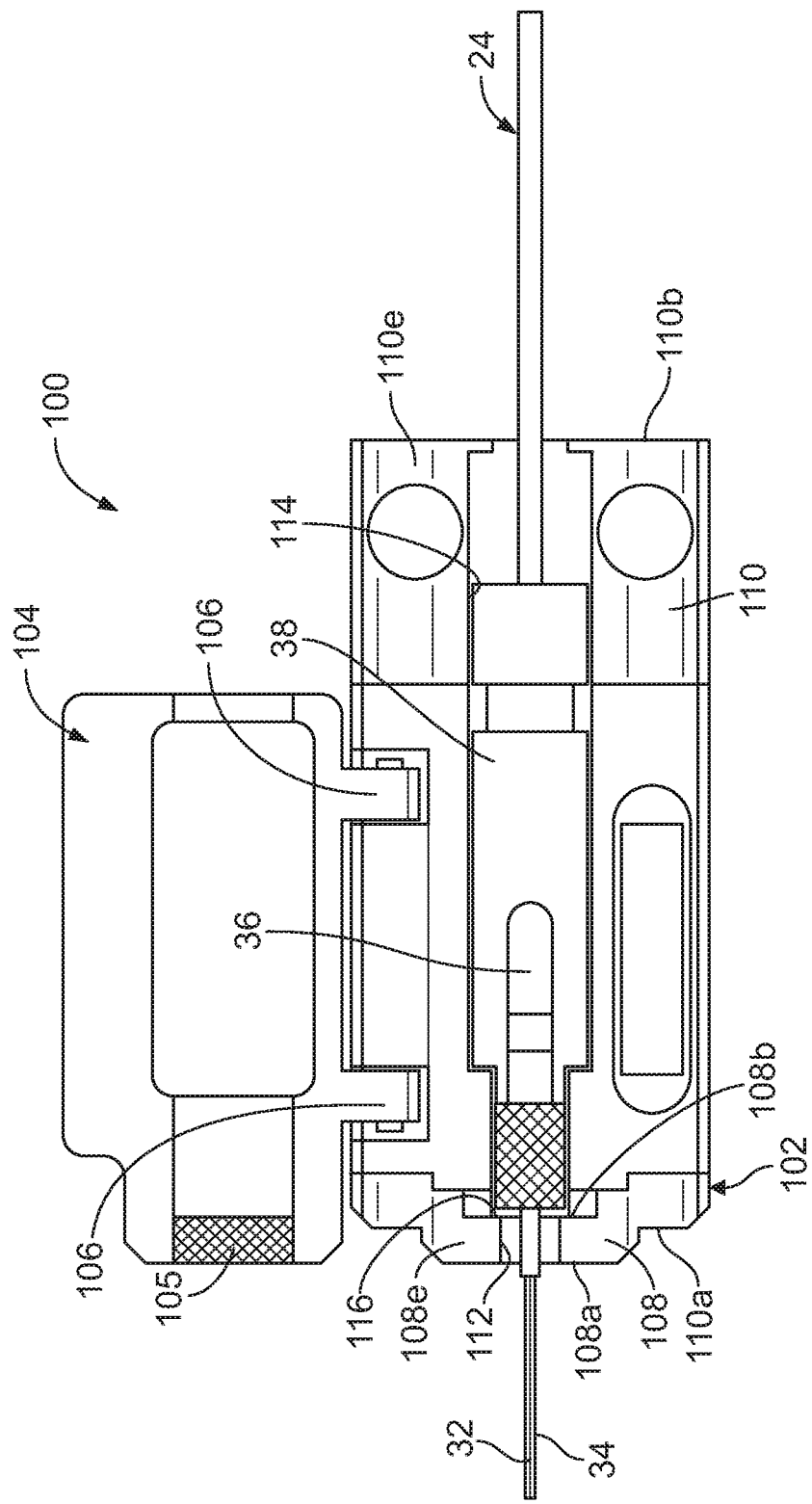
FIG. 7 is top plan view of an alternate adapter which is configured to hold a splice-on connector.
Figure 8:
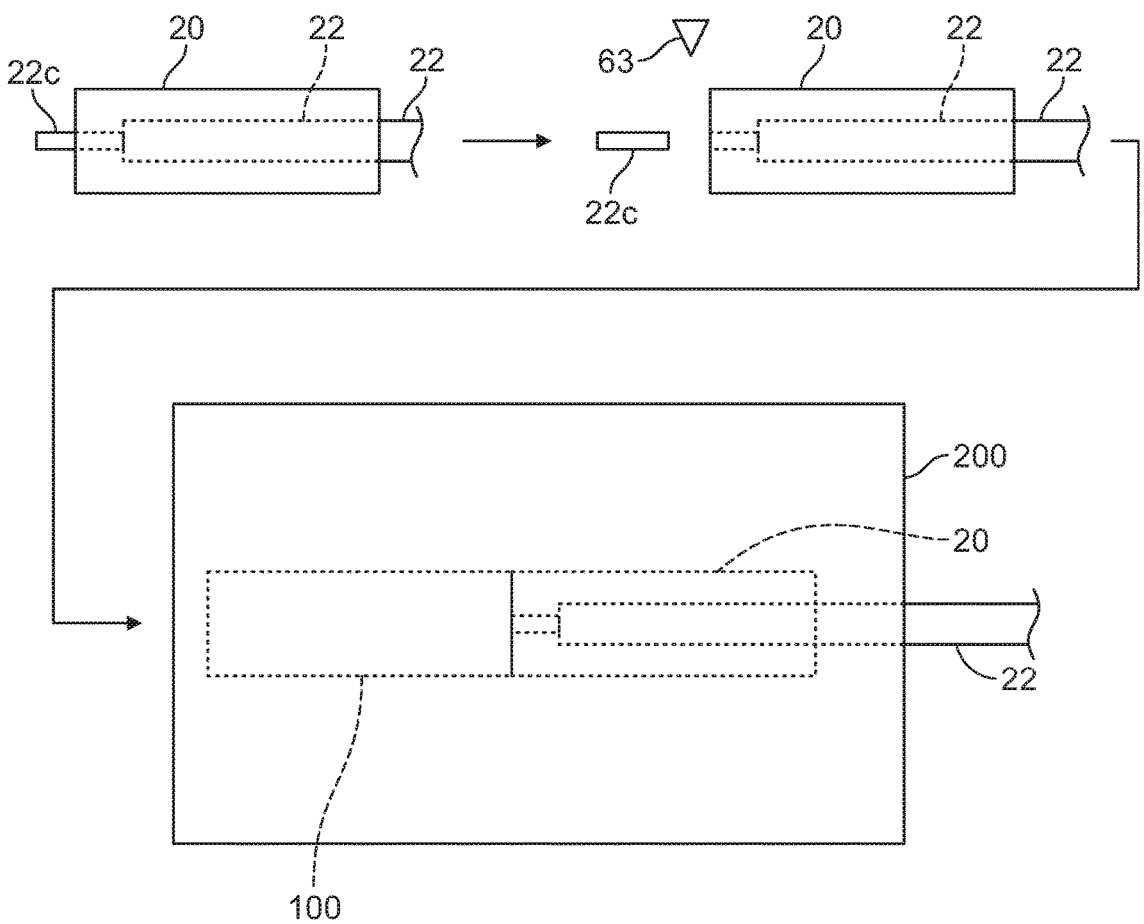
FIG. 8 is a schematic view of the adapters showing use of the adapters in the method of use.

An adapter 20 is provided which securely holds a tube fiber cable 22, such as by way of example, a 250-micron loose tube fiber cable, for fusion splicing, for fusion splicing, either to another fiber cable 22 or to a splice-on connector 24. As shown in FIGS. 2 and 3, loose tube fiber cables 22 have a semi-rigid protective outer jacket 26 in which optical fiber(s) 28, each of which are surrounded by a tight buffer coating 30, is/are enclosed. For purposes of illustrative example, the optical fiber 28 may be 250 microns and the jacket 26 may be 900 microns, but it will be appreciated that other sizes are contemplated within the scope of the disclosure and the adapter 20 may be configured to accommodate such other sizes within the scope of the disclosure. The optical fiber 28 is bundled loosely within the outer jacket 26 and the optical fiber 28 can move relative to the outer jacket 26. Splice-on connectors 24 are known in the art. As shown in FIG. 7, a splice-on connector 24 includes an optical fiber 32 within a plastic splice sleeve 34, the optical fiber 32 being terminated to a connector 36 which is surrounded by a boot 38. The optical fibers 28, 32 or optical fibers 28, 28 are spliced together using a known fusion splicer 200, such as the Greenlee 910FS Optical Fusion Splicer or competitive fusion splicers.

The adapter 20 includes a clamp base 40 and a clamp cover 42 which mates with the clamp base 40 to sandwich the loose bundle fiber cable 22 therebetween. The clamp base 40 and clamp cover 42 may be hingedly attached to each other by hinges 44 such that the clamp cover 42 rotates relative to the clamp base 40. Alternatively, the clamp base 40 and clamp cover 42 need not be permanently joined together and may be mated together to sandwich the loose bundle fiber cable 22 therebetween. If the adapter 20 is formed of a separated clamp base 40 and clamp cover 42, suitable means for securing the clamp base 40 and clamp cover 42 together and for releasing the clamp cover 42 from the clamp base 40 are provided, such as magnets, snap locks or the like.

The clamp base 40 is formed of metal and may be formed of a first body section 46 and a second body section 48.

The first body section 46 has opposite first and second edges 46a, 46b, opposite side edges 46c, 46d extending between the first and second edges 46a, 46b, a top surface 46e and an opposite bottom surface 46f. A height H1 is defined between the top and bottom surfaces 46e, 46f. A length L1 of the first body section 46 is defined between the first and second ends 46a, 46b.

The second body section 48 has opposite first and second edges 48a, 48b, opposite side edges 48c, 48d extending between the first and second edges 48a, 48b, a top surface 48e and an opposite bottom surface 48f. A height H2 is defined between the top and bottom surfaces 48e, 48f. The bottom surfaces 46f, 48f align with each other and form a planar surface. The first body section 46 may have a height H1 which is greater than the height H2 of the second body section 48. A length L2 of the second body section 48 is defined between the first and second ends 48a, 48b.

Figure 4:
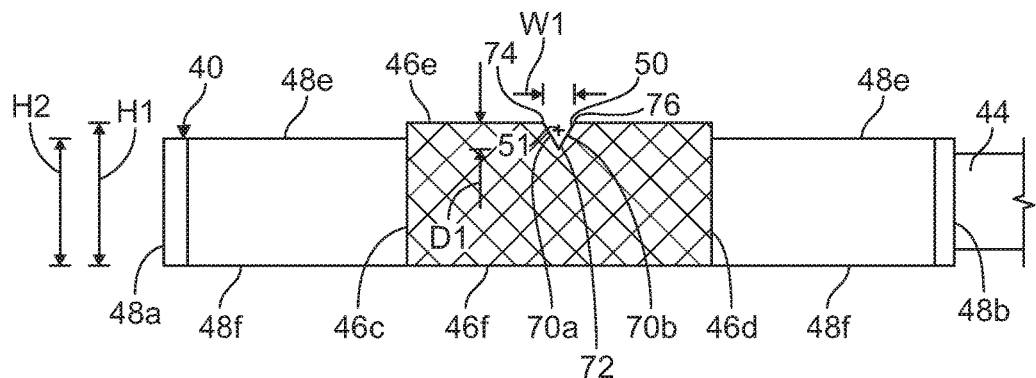
FIG. 4 is a cross-sectional view along line 4-4 of FIG. 1.

A groove 50, see FIG. 4, extends downwardly from the top surface 46e and extends from the first edge 46a to the second edge 46b, and defines a first groove. The first groove 50 is sized to be slightly smaller than the size of the optic fiber 28. The first groove 50 is shaped as a "V" having angled side walls 70a, 70b which meet at an apex 72; the apex 72 forming a lowest most point of the first groove 50. The first groove 50 has a depth D1 which is defined as the distance from the top surface 46e to the apex 72. The first groove 50 has a width W1 which is defined as the distance between opposite edges 74, 76 of the first groove 50 at the top surface 46e. A centerline 51 of the first groove 50 is defined at the midpoint of the depth D1 and the midpoint of the width W1.

Figure 5:
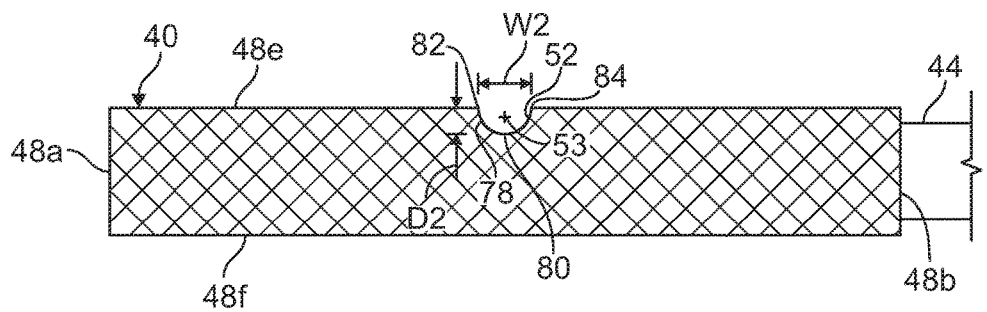
FIG. 5 is a cross-sectional view along line 5-5 of FIG. 1.
Figure 6:
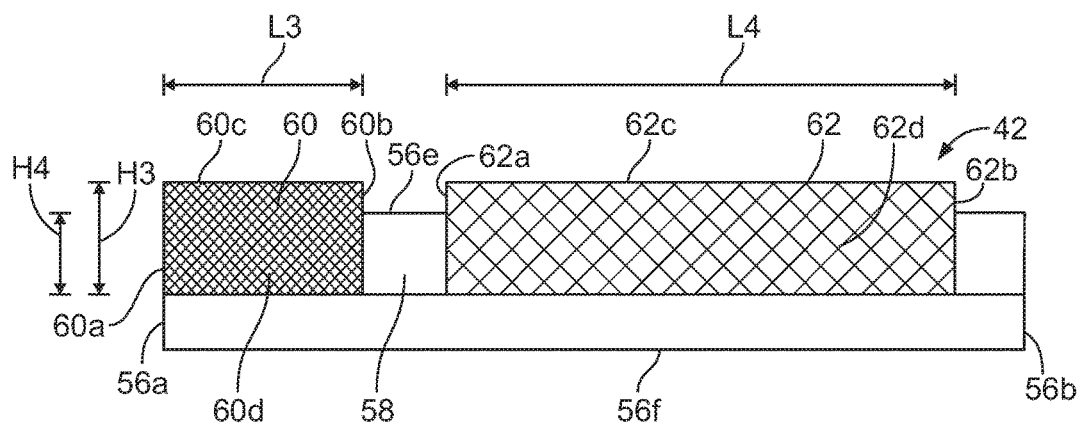
FIG. 6 is a side elevation view of the adapter.

A groove 52, see FIG. 5, extends downwardly from the top surface 48e and extends from the first edge 48a to the second edge 48b, and defines a second groove. The second groove 52 is sized to be slightly larger than the size of the tight buffer coating 30. The second groove 52 is formed by a wall 78 which may take a variety of shapes. For example, the wall 78 may be V-shaped, U-shaped (as shown) or square-shaped. A lowest most point 80 is defined by the second groove 52 at the lowest most extent of the second groove 52. The second groove 52 has a depth D2 which is defined as the distance from the top surface 48e to the lowest most point 80. The second groove 52 has a width W2 which is defined as the distance between opposite edges 82, 84 of the second groove 52 at the top surface 48e. A centerline 53 of the second groove 52 is defined at the midpoint of the depth D2 and the midpoint of the width W2.

To accommodate the dimensions of the loose tube fiber cable 22, the first groove 50 has a depth D1 which is less than the depth D2 of the second groove 52. The first groove 50 has a width W1 which is less than the width W2 of the second groove 52. As such, a shoulder 54 is defined between the first and second body sections 46, 48 by the grooves 50, 52. The centerlines of the grooves 50, 52 align with each other along the lengths L1, L2 of the first body section 46, 48.

The depth D1 of the first groove 50 is designed so that the majority of the optical fiber 28 seats within the groove 50 and a top of the optical fiber 28 is located slightly above the groove 50, that is the top of the optical fiber 28 is located slightly above top surface 46c. The depth D2 of the second groove 52 is designed so that a centerline of the optical fiber 28 may be located within or above the second groove 52. As such, the second groove 52 has a deeper depth D2 than the depth D1 of the first groove 52 to accommodate the tight buffer coating 30. In an alternative embodiment, the top surfaces 46e, 48e are planar with each other and the differently sized grooves 50, 52 form the shoulder 54 while positioning the optical fiber 28 and tight buffer coating 30 as described herein.

The clamp cover 42 is formed of a metal body 56 which has opposite first and second edges 56a, 56b, opposite side edges 56c, 56d extending between the first and second edges 56a, 56b, a top surface 56e and an opposite bottom surface 56f (these are defined with the adapter 20 in an open position). A groove 58 is provided in the top surface and extends from the first edge 56a to the second edge 56b. The groove 58 may take a variety of shapes and is formed from at least one wall. The groove 58 may be generally U-shaped. The groove 58 is sized to have a width W3 (the distance between opposite edges 58a, 58b of the groove 58 at the top surface 56f) which is at least as wide as the width W1 of the groove 50 in the clamp base 40. As shown, the groove 58 is substantially wider than the groove 50.

A first pad 60 is mounted within the groove 58 and extends from the first edge 56a towards the second edge 56b. The first pad 60 has opposite first and second ends 60a, 60b, a top surface 60c, and the remainder 60d of the first pad 60 is formed to seat within the groove 58. A length L3 of the first pad 60 is defined between the first and second ends 60a, 60b. The remainder 60d of the first pad 60 may completely fill a first portion of the groove 58 or partially fill the first portion of the groove 58. The first pad 60 is attached within the groove 58 by suitable means, such as adhesive. A second pad 62 is mounted within the groove 58 and extends from the second edge 56b towards the first edge 56a. The second pad 62 has opposite first and second ends 62a, 62b, a top surface 62c and the remainder 62d of the second pad 62 is formed to seat within the groove 58. A length L4 of the second pad 62 is defined between the first and second ends 62a, 62b. The remainder 62d of the second pad 62 may completely fill a second portion of the groove 58 or partially fill the second portion of the groove 58. The second pad 62 is attached within the groove 58 by suitable means, such as adhesive. The ends 60b, 62a of the first and second pads 60, 62 which are proximate to each other may be spaced apart from each other as shown to form a space 61, or may abut against each other. Each pad 60, 62 is formed of a compressible material, such as foam rubber. The first pad 60 may have a height H3 (defined between the lowest most point of the groove 58 and the top surface 60c when the first pad 60 is in an uncompressed condition) which is greater than the height H4 of the second pad 62 (defined between the lowest most point of the groove 58 and the top surface 62c when the second pad 62 is in an uncompressed condition), or the pads 60, 62 may have the same height, or substantially the same heights. The top surface 60c, 62c of each pad 60, 62 may extend upwardly from the top surface 56e of the clamp cover 42 when in an uncompressed condition, or may be flush or substantially flush with the top surface 56e of the clamp cover 42 when in an uncompressed condition.

Length L1 may be less than length L2. Length L3 may be less than length L4. Lengths L1 and L3 may be substantially the same, or length L3 may be less than L1. Lengths L2 and L4 may be substantially the same, or length L4 may be less than L2.

In use, the jacket 26 is stripped in a known manner from an end section of the loose tube fiber cable 22 to expose the optical fiber 28 and to provide a stripped end section 22a and a jacketed section 22b. The optical fiber 28 is then cleaned, for example using isopropyl alcohol. The loose tube fiber cable 22 is seated into the grooves 50, 52 of the clamp base 40 such that the stripped end section 22a seats in the first groove 50 and the jacketed section 22b seats in the second groove 52. The end of the jacket 26 abuts against the shoulder 54 so that the stripped end section 22a is properly seated within the first groove 50. A portion 22c of the stripped end section 22a of the loose tube fiber cable 22 extends outwardly from the first end 46a of the first body section 46.

The clamp cover 42 is then seated on the top surfaces 46e, 48e of the clamp base 40 to place the clamp cover 42 into a facing relationship with the clamp base 40. The first pad 60 aligns with the first groove 50. The first pad 60 engages with the stripped end section 22a and the second pad 62 engages with the jacketed section 22b. The first pad 60 compresses around the stripped end section 22a to also engage against the top surface 46e and clamps the stripped end section 22a into place within the first groove 50. The clamping engagement of the first pad 60 with the stripped end section 22a prevents the stripped end section 22a from moving, turning or twisting within the first groove 50, and also prevents the stripped end section 22a from moving relative to the jacketed section 22b. If the second pad 62 is provided, the second pad 62 aligns with the second groove 52. If the second pad 62 is provided, the second pad 62 may compress and may engage against the top surface 48e, but does not exert substantial force on the jacketed section 22b. The second pad 62 is used to generally hold the jacketed section 22b in place. Since the stripped end section 22a is held firmly in place between the first groove 50 and the first pad 60, the stripped end section 22a can be cleaved in a known manner, for example by using a knife 63, to separate the stripped end section 22a from the remainder of the optical fiber 28, without concern that the optical fiber 28 will move relative to the jacket 26 during the cleaving operation.

The optical fiber 28 is then cleaved using a cleaver in a known manner. The cable is not removed from the adapter 20 and the adapter 20 is thereafter placed into the fusion splicer 200.

A second adapter 100 is provided for the splice-on connector 24 for direct insertion into the fusion splicer 200. The second adapter 100 includes a clamp base 102 and a clamp cover 104 which mates with the clamp base 102 to sandwich the splice-on connector 24 therebetween. The clamp base 102 and clamp cover 104 may be hingedly attached to each other by hinges 106 such that the clamp member 102 rotates relative to the clamp base 104. Alternatively, the clamp base 102 and clamp cover 104 need not be permanently joined together and may be mated together to sandwich the splice-on connector 24 therebetween. If the second adapter 100 is formed of a separated clamp base 102 and clamp cover 104, suitable means for securing the clamp base 102 and clamp cover 104 together and for releasing the clamp cover 104 from the clamp base 102 are provided, such as magnets, snap locks or the like. The clamp base 102 may have the same outer dimensions as the clamp base 40 of the adapter 20 so that either the adapter 20 or the adapter 100 can be used within the fusion splicer 200 without the need for separate adapters.

The clamp base 102 is formed of metal and has a first body section 108 and a second body section 110. The first body section 108 has opposite first and second edges 108a, 108b, opposite side edges extending between the first and second edges 108a, 108b, a top surface 108e and an opposite bottom surface. A groove 112 is provided in the top surface 108e and extends from the first edge 108a to the second edge 108b, and defines a first groove. The groove 112 is sized to hold the splice-on connector 24 therein, while allowing the optical fiber 32 to extend from the first edge 108a. A height is defined between the top surface 108e and the bottom surface. The second body section 110 has opposite first and second edges 110a, 110b, opposite side edges extending between the first and second edges 110a, 110b, a top surface 110e and an opposite bottom surface. A groove 114 is provided in the top surface 110e and extends from the first edge 110a to the second edge 110b, and defines a second groove. The groove 114 is sized to hold the splice-on connector 24 therein. A height is defined between the top surface 110e and the bottom surface. The centerlines of the grooves 112, 114 align with each other. The bottom surfaces align with each other and form a planar surface. The first body section 108 has a greater height than the height of the second body section 110.

The first groove 112 is sized to be slightly larger than the size of the sleeve 34. The second groove 114 is sized to be slightly larger than the size of the boot 38. As such, the first groove 112 has a depth (the distance from the upper surface to the lowest most point of the first groove 112) which is less than the depth of the second groove 114 (the distance from the upper surface to the lowest most point of the second groove 114), and the first groove 112 has a width (the distance between opposite edges of the first groove 112 at the top surface 108e) which is less than the width of the second groove 114 (the distance between opposite edges of the second groove 114 at the top surface 110e). A shoulder 116 is defined between the first and second body sections 108, 110. The groove 112 is formed from at least one wall and is shaped to closely conform to the shape of the sleeve 34 and the groove 114 is formed from at least one wall and is shaped to closely conform to the remainder of the splice-on connector 24 that seats within the groove 113. The depth of the grooves 112, 114 are designed so that a centerline of the optical fiber 32 may be located within or above the groove 112. In an alternative embodiment, the upper surfaces 108e, 110e are planar with each other and the differently sized grooves 112, 114 form the shoulder 54.

The clamp cover 104 is formed of a metal body which has opposite first and second edges, opposite side edges extending between the first and second edges, a top surface and an opposite bottom surface. The clamp cover 104 may have a compressible pad 105 mounted thereon which aligns with the first groove 112 when the clamp cover 104 is placed into a facing relationship with the clamp base 102.

In use, the sleeve 34 with the optical fiber 32 therein seats within the first groove 112 and the connector 36 and boot 38 seat within groove 114, with the sleeve 34 and optical fiber 32 extending from the first edge 108a. The clamp cover 104 is then seated on top of the clamp base 102 to secure the splice-on connector 24 within the second adapter 100.

The second adapter 100 is then placed into the fusion splicer 200 on the opposite side to that which the first adapter 20 is placed. The fusion splicer 200 is then used to splice the splice-on connector 24 seated in the second adapter 100 with the optical fiber 32 seated in the first adapter 20 in a known manner.

Alternatively, two first adapter 20 with optical fibers 32 seated therein can be placed into the fusion splicer 200 to splice the optical fibers 32 together.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. An adapter configured to hold a loose tube fiber cable having a protective outer jacket in which at least one coated optical fiber is provided or configured to hold a splice-on connector, the adapter being mountable into a fusion splicer, the adapter comprising:
   a clamp base having a first surface, a first groove formed in the first surface, the first groove having a length and a depth, the depth of the first groove being defined by a distance from the surface to a lowest most point of the first groove, the first groove defining a centerline which extends along the length of the first groove, the second groove having a length and a depth, the depth of the second groove being defined by a distance from the surface to a lowest most point of the second groove, the second groove defining a centerline which extends along the length of the second groove, the depth of the second groove being greater than the depth of the first groove such that a shoulder is formed in the clamp base between the first and second grooves, the centerlines of the grooves aligning with each other; and
   a clamp cover having a second surface which is configured to be placed into a facing relationship with the first surface of the clamp base, the clamp cover including a body and a compressible pad mounted on the body, the compressible pad aligning with the first groove when the clamp cover is placed in the facing relationship with the clamp base.

2. The adapter of claim 1, wherein the first groove has walls that form a V-shape.

3. The adapter of claim 2, wherein the second groove has at least one wall that forms one of a V-shape, U-shape and a square-shape.

4. The adapter of claim 1, wherein the first groove further has a width which is defined between opposite edges of the first groove at the surface, and the second groove further has a width which is defined between opposite edges of the second groove at the surface, the width of the second groove being greater than the width of the first groove.

5. The adapter of claim 1, wherein the clamp base and the clamp cover are hingedly connected to each other.

6. The adapter of claim 1, wherein the clamp cover further comprises a second compressible pad mounted on the body, the second compressible pad aligning with the second groove when the clamp cover is placed in the facing relationship with the clamp base.

7. The adapter of claim 6, wherein the second compressible pad has a height which is less than a height of the first compressible pad.

8. The adapter of claim 6, wherein the first and second compressible pads seat within a groove formed in the body.

9. The adapter of claim 8, wherein the first and second compressible pads are spaced apart from each other.

10. The adapter of claim 1, further in combination with a loose tube fiber cable, the loose tube fiber cable being seated within the first and second grooves.

11. The adapter of claim 10, further in combination with a second adapter and a splice-on connector, the splice-on connector being seated within the second adapter.

12. An adapter configured to hold a loose tube fiber cable having a protective outer jacket in which at least one coated optical fiber is provided or configured to hold a splice-on connector, the adapter being mountable into a fusion splicer, the adapter comprising:
   a clamp base having a first surface, a first groove formed in the first surface, the first groove having a length, a width and a depth, the width being defined between opposite edges of the first groove at the surface, the depth of the first groove being defined by a distance from the surface to a lowest most point of the first groove, the first groove defining a centerline which extends along the length of the first groove, the first groove having walls that form a V-shape, the second groove having a length, a width and a depth, and the width being defined between opposite edges of the second groove at the surface, the depth of the second groove being defined by a distance from the surface to a lowest most point of the second groove, the second groove defining a centerline which extends along the length of the second groove, the second groove having at least one wall that forms one of a V-shape, U-shape and a square-shape, the width of the second groove being greater than the width of the first groove, the depth of the second groove being greater than the depth of the first groove such that a shoulder is formed in the clamp base between the first and second grooves, the centerlines of the grooves aligning with each other; and
   a clamp cover having a second surface which is configured to be placed into a facing relationship with the first surface of the clamp base, the clamp cover including a body and a compressible pad mounted on the body, the compressible pad aligning with the first groove when the clamp cover is placed in the facing relationship with the clamp base.

13. The adapter of claim 12, wherein the clamp base and the clamp cover are hingedly connected to each other.

14. The adapter of claim 12, wherein the clamp cover further comprises a second compressible pad mounted on the body, the second compressible pad aligning with the second groove when the clamp cover is placed in the facing relationship with the clamp base.

15. The adapter of claim 14, wherein the second compressible pad has a height which is less than a height of the first compressible pad.

16. The adapter of claim 14, wherein the first and second compressible pads seat within a groove formed in the body.

17. The adapter of claim 16, wherein the first and second compressible pads are spaced apart from each other.

18. The adapter of claim 12, further in combination with a loose tube fiber cable, the loose tube fiber cable being seated within the first and second grooves.

19. The adapter of claim 18, further in combination with a second adapter and a splice-on connector, the splice-on connector being seated within the second adapter.

20. A method comprising:
   mounting a loose tube fiber cable into the adapter of claim 1;
   cleaving a fiber optic cable of the loose tube fiber cable while mounted in the adapter; and
   placing the adapter into a fusion splicer.

* * * * *

UNITED STATES PATENT AND TRADEMARK OFFICE
CERTIFICATE OF CORRECTION

PATENT NO. : 9,835,799 B2  
APPLICATION NO. : 15/084965  
DATED : December 5, 2017  
INVENTOR(S) : Foord Page 1 of 1

It is certified that error appears in the above-identified patent and that said Letters Patent is hereby corrected as shown below:

On the Title Page

In Item (56), under "OTHER PUBLICATIONS", in Column 2, Line 1, delete "CLAMP-370" and insert -- CLAMP-S70 --, therefor.

In the Specification

In Column 3, Line 4, delete "46f A" and insert -- 46f. A --, therefor.

In Column 3, Line 5, delete "46e ," and insert -- 46e, --, therefor.

In Column 3, Line 7, delete "46a ," and insert -- 46a, --, therefor.

In Column 3, Line 11, delete "48f A" and insert -- 48f. A --, therefor.

In Column 3, Line 61, delete "top surface 46c." and insert -- top surface 46e. --, therefor.

In Column 4, Line 7, delete "56a ," and insert -- 56a, --, therefor.

In Column 4, Line 15, delete "surface 56f)" and insert -- surface 56e) --, therefor.

In Column 5, Line 60, delete "108b ," and insert -- 108b, --, therefor.

Signed and Sealed this  
Seventh Day of August, 2018

Andrei Iancu  
*Director of the United States Patent and Trademark Office*